(12) United States Patent  
Miller et al.

(10) Patent No.: US 8,844,341 B2
(45) Date of Patent: Sep. 30, 2014

(54) DATA COLLECTOR FOR AN INTERNAL ENGINE COMPONENT

(71) Applicant: Federal-Mogul Corporation, Southfield, MI (US)

(72) Inventors: Andrew J. Miller, Plymouth, MI (US); Jonathan Owen Neuendorf, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 25 days.

(21) Appl. No.: 13/784,015

(22) Filed: Mar. 4, 2013

(65) Prior Publication Data

US 2014/0245821 A1    Sep. 4, 2014

(51) Int. Cl.
*G01M 15/04*    (2006.01)

(52) U.S. Cl.
CPC ..................... *G01M 15/04* (2013.01)
USPC ...................... 73/114.01; 73/114.77

(58) Field of Classification Search
USPC ......................... 73/114.01, 114.77
See application file for complete search history.

(56) References Cited

U.S. PATENT DOCUMENTS

| | | | |
|---|---|---|---|
| 3,324,724 A * | 6/1967 | Essers et al. ................. 374/154 |
| 3,596,262 A * | 7/1971 | Rollwitz et al. ........ 340/870.37 |
| 5,106,202 A | 4/1992 | Anderson et al. |
| 5,151,695 A * | 9/1992 | Rollwitz et al. ......... 340/870.33 |
| 5,736,937 A * | 4/1998 | McGirr et al. ........... 340/870.16 |
| 6,272,402 B1 * | 8/2001 | Kelwaski ......................... 701/1 |
| 6,999,000 B2 | 2/2006 | Campbell et al. |
| 7,102,534 B2 | 9/2006 | Ha |
| 7,149,622 B2 | 12/2006 | Kim et al. |
| 7,492,280 B2 | 2/2009 | Horler |
| 8,092,080 B2 * | 1/2012 | Mitchell et al. ............... 374/100 |
| 8,429,958 B2 * | 4/2013 | Saito et al. ................. 73/114.78 |
| 2004/0105484 A1 * | 6/2004 | Ha ................. 374/141 |
| 2005/0174255 A1 * | 8/2005 | Horler ..................... 340/870.01 |
| 2009/0179769 A1 | 7/2009 | Horler |
| 2009/0195409 A1 | 8/2009 | Horler |
| 2011/0113873 A1 | 5/2011 | Saito et al. |

\* cited by examiner

*Primary Examiner* — Freddie Kirkland, III
(74) *Attorney, Agent, or Firm* — Robert L. Stearns; Dickinson Wright, PLLC

(57) ABSTRACT

An internal engine component including a data collector assembly is provided. The data collector assembly includes a sensor for sensing a condition and for generating a signal corresponding to the condition and a digital to analog converter for converting the signal to a digital signal. The data collector assembly also includes a memory for storing data, a clock and a processor. A power source is electrically connected to the sensor, the analog to digital converter, the memory, the clock and the processor. During an engine test, the processor, sensor, digital to analog converter, clock and memory are substantially the only devices that draw electricity from the power source.

20 Claims, 4 Drawing Sheets

DATA COLLECTOR FOR AN INTERNAL ENGINE COMPONENT

BACKGROUND OF THE INVENTION

1. Field of the Invention

The present invention is related generally to data collectors for collecting and storing data related to at least one condition of an internal engine component during an engine test and to methods of extracting data.

2. Related Art

Before engine manufacturers allow their products to be sold, each and every component is extensively tested and evaluated for performance and durability purposes. However, evaluating internal engine components, such as pistons, connecting rods and gudgeon (or wrist) pins, is typically very difficult since these components are not readily accessible and operate in extreme environments. To properly evaluate such components, many engine manufacturers will make substantial changes to the engine block to accommodate various linkages and transmitting systems. Such modifications are not only costly and time consuming but also undesirable because the engines being tested are in high demand and are costly to produce, especially during the very early development phase.

Another approach some engine manufacturers use is to attach a data collector assembly with a wireless transmitter/receiver to the internal engine component. In addition to the wireless transmitter, such data collector assemblies typically include a battery, a plurality of sensors, at least one processor and a buffer memory which is configured to only store data until the data is transmitted via the wireless transmitter to a remote computer. Shortly before the engine begins, a person must manually activate the data collector assembly. During the engine test, a substantial amount of the electrical power from the battery is used by the wireless transmitter/receiver to transmit the data to a remote computer.

SUMMARY OF THE INVENTION

An aspect of the present invention provides for a data collector assembly for collecting and storing data related to at least one condition of an internal engine component during an engine test. The data collector assembly includes a sensor for sensing a condition of the internal engine component and for generating a signal corresponding to the sensed condition and a digital to analog converter for converting the signal into a digital signal. The data collector assembly also includes a memory for storing data and a clock. The data collector assembly additionally includes a processor which is in electrical communication with the digital to analog converter, the memory and the clock. The processor is configured to process the digital signal and store data corresponding to the digital signal on the memory. At least one power source is electrically connected to the sensor, the digital to analog converter, the memory, the processor and the clock. During the engine test, the sensor, digital to analog converter, the memory, the processor and the clock are configured to be substantially the only devices that draw electricity from the power source. The data collector assembly is advantageous as compared to other known data collector assemblies because it lacks a power hogging wireless transmitter/receiver, thereby allowing for a smaller power source to be employed. In addition to providing for packaging advantages, smaller power sources are typically more reliable than larger power sources when operating in extreme environments, such as those found within an internal combustion engine.

According to another aspect of the present invention, the processor only stores data in the memory in response to the signal from the sensor crossing a predetermined threshold which corresponds to the beginning of the engine test. This provides for improved life of the power source and for a smaller memory to be used because data is not stored onto the memory before the engine test begins. It also provides for easier analyzation of the data stored on the memory.

Another aspect of the present invention provides for an internal combustion engine component including the above-described data collector assembly.

According to yet another aspect of the present invention, the processor processes the signal at a predetermined frequency and processes and stores data in the memory at an increased frequency in response to the signal crossing a predetermined threshold which corresponds to the beginning of the engine test. As such, the data collector assembly processes data at a low frequency before the engine test and automatically increases the frequency of the processing and begins storing data after the engine test begins. This further reduces power demands, thereby allowing for an even smaller power source to be employed in the data collector assembly. The automatic changing in the frequency at which data is sampled and recorded changes automatically without any input from the testing staff.

Still another aspect of the present invention is related to a method of making an internal engine component. The method includes the step of preparing a body of an internal engine component. The method continues with coupling to the body of the internal engine component a sensor configured to sense a condition and generate a signal corresponding to the sensed condition and a digital to analog converter for converting the signal to a digital signal. The method proceeds with the step of coupling a memory for storing data, a clock, and a processor to the body of the internal engine component. The processor is in electrical communication with the analog to digital converter, the memory and the clock. The method then proceeds with the step of coupling a power source to the body of the internal engine component and electrically connecting the power source to the memory, the processor, the sensor, the analog to digital converter and the clock. The memory, the processor, the sensor, the analog to digital converter and the clock are configured to be substantially the only devices that draw electricity from the power source during an engine test.

Yet another aspect of the present invention is related to a method of collecting and storing data corresponding to a condition of an internal engine component. The method includes the step of preparing an internal combustion engine including at least one internal engine component with a data collector disposed thereon, wherein the data collector includes a sensor, an analog to digital converter, a processor, a memory and a clock. The method continues with the step of testing the internal combustion engine. The method proceeds with the steps of sensing with the sensor at least one condition of the internal engine component, generating a signal corresponding to the condition or conditions sensed by the sensor and converting the signal to a digital signal with the analog to digital converter. The method then proceeds with storing data corresponding to the digital signal in the memory. The method continues with powering the sensor, analog to digital converter, processor, memory and clock with a power source, and wherein the sensor, analog to digital converter, processor, memory and clock are substantially the only devices that draw electricity from the power source during the engine test.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
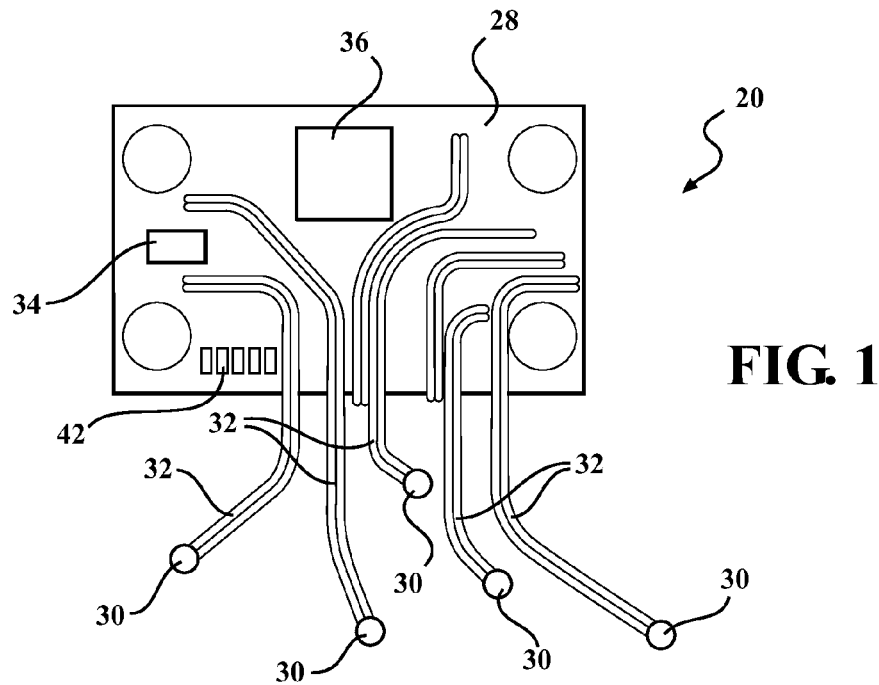
FIG. 1 is a top elevation view of an exemplary data collector.

An improved data collector assembly 20 for collecting data related to a condition of the body of an internal engine component of an internal combustion engine (not shown) during an engine test is generally shown in FIG. 1. The exemplary data collector assembly 20 is disposed on a piston 22 in the exemplary embodiment of FIGS. 2 and 3; on a connecting rod 24 in the embodiment of FIG. 4; and an alternate embodiment of the data collector assembly 120 is shown on a gudgeon (or wrist) pin 26 in FIGS. 5 and 6. However, it should be appreciated that the data collector assembly 20, 120 could alternately be attached to any desirable internal engine component, i.e. any component which is enclosed within a cavity defined by the crank case (not shown) and the cylinder head (not shown) of the internal combustion engine.

Referring back to FIG. 1, the data collector assembly 20 includes a printed circuit board (PCB 28) and at least one sensor 30 for monitoring a condition of the internal engine component and generating an analog signal corresponding to the condition. Specifically, in the first exemplary embodiment, the sensors 30 are thermocouples 30 or thermistors for sensing the temperature of the piston 22. The thermocouples 30 are configured to be attached to the internal engine component in any desirable manner including, for example, through adhesives, glue, a potting material, etc. The thermocouples 30 are coupled to the PCB 28 with wires 32 so that they may be secured to different locations of the piston 20, thereby allowing the data collector assembly 20 to collect and store data related to various locations of the internal engine component. It should be appreciated that the data collector assembly 20 could alternately or additionally include different types of sensors including, for example, pressure or strain sensors. The thermocouples 30 or other sensors are configured to output analog signals which correspond to the conditions they are designed to monitor. For example, a thermocouple 30 might generate one signal having a predetermined amplitude when exposed to a certain temperature and a different signal having a lower amplitude when exposed to a lower temperature.

Figure 7:
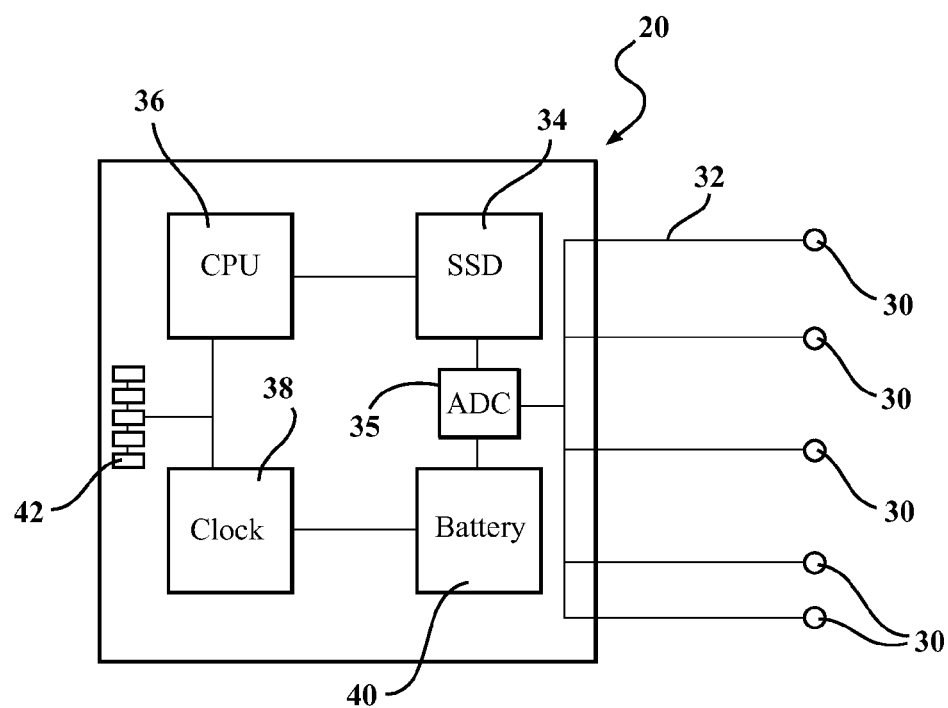
FIG. 7 is a schematic view of the exemplary data collector of FIG. 1.

Referring now to the block diagram to FIG. 7, the data collector assembly 20 also includes a memory 34 (which could be, for example, a computer readable memory) for storing data and a digital to analog converter 35 for converting the analog signals from the sensors 30 into digital signals. The memory 34 is preferably a solid state disc (SSD) for reliability purposes because SSDs are generally reliable in vibrating environments, as is the case with many internal engine components. The data collector assembly 20 further includes a processor 36 which is electrically connected to the digital to analog converter 35 and to the memory 34 for processing the digital signals and storing data corresponding to the digital signals in the memory 34.

Referring still to the block diagram of FIG. 7, the exemplary data collector assembly 20 also includes a clock 38. The processor 36, memory 34, sensors 30, analog to digital converter 35 and clock 38 are all electrically connected to a power source 40 and are substantially the only components that draw electrical power from the power source 40 during the normal operation of the data collector assembly 20, i.e. when the data collector assembly 20 is storing data in the memory 34. In the exemplary embodiment, the power source 40 is a battery 40 but a power generator (such as, for example, a magnet and coil generator; an induction generator; a piezoelectric generator; a thermogradient generator; etc.) could alternately be employed. Since the data collector assembly 20 does not also include any wireless transmitter as is common in other known data collector assemblies, the power source 40 may be much smaller and have a lower electrical capacity than the power sources found in other known data collector assemblies. In addition to packaging advantages, this also provides for significant reliability savings since the larger power sources found in other known data collector assemblies tend have a high failure rate when exposed to the extreme operating temperatures and conditions that internal engine components operate in.

In order to extract data from the memory 34, the data collector assembly 20 additionally includes a computer connection port 42, which is a serial connector 42 in the exemplary embodiment shown in FIG. 1. However, the computer connection port 42 could be of any desirable type of non-wireless connector for establish electrical communication between the memory 34 and an external computer to extract the data stored in the memory 34 to a remote computer (not shown) external to the data collector assembly 20.

The exemplary processor 36 is configured to monitor the digital signals converted from the analog signals generated by the sensors 30 at a predetermined frequency (or at predetermined intervals) without storing data and then automatically increase the frequency and begin storing data in the memory 34 in response to the signals from at least one of the sensors 30 either exceeding or falling below a predetermined threshold signal value. This allows for improved life of the power source 40 since the power demands of the data collector assembly 20 only increase when needed. This may also enable the exemplary data collector assembly 20 to collect and store additional data during the testing of the internal engine component. For example, in a data collector assembly 20 that is configured to collect temperature data, the processor 36 could be configured to monitor the digital signals at five minute intervals. Then, once the digital signals correspond to temperatures in excess of one hundred and fifty degrees Fahrenheit (150° F.), the processor 36 automatically begins processing and storing data into the memory 34 at one second intervals until the digital signals once again correspond to temperatures below one hundred and fifty degrees Fahrenheit (150° F.). At that point the processor 36 automatically returns to monitoring the signals from the thermocouples 30 at five minute intervals. As such, the data collector assembly 20 does not require a technician or anyone else to "turn it on" before the beginning of an engine test or to "turn it off" after the engine test is completed. Rather, a data collector assembly 20 may be installed on an internal engine component by, for example, the manufacturer of the internal engine component.

The manufacturer may then give the modified internal engine component to an engine technician who simply installs the modified internal engine component in an engine as he or she would if it was not modified. The technician may then conduct the engine test without paying any additional attention to the modified internal engine component and return the modified engine component to its manufacturer after the engine test is completed. This allows the engine test to be run entirely by technicians who do not have to do anything other than install the modified component in the engine to be tested and remove it after the engine test is complete. This may provide additional cost savings since representatives of the internal engine component manufacturer do not have to be physically present during the engine test.

Figure 2:
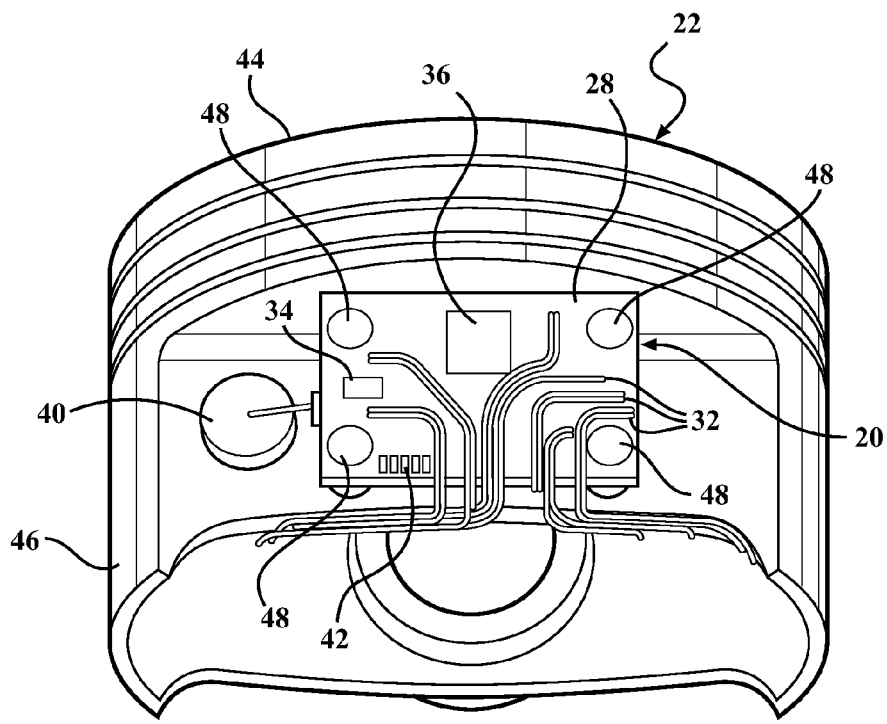
FIG. 2 is a perspective elevation view of an exemplary piston with the data collector of FIG. 1 mounted thereon.
Figure 3:
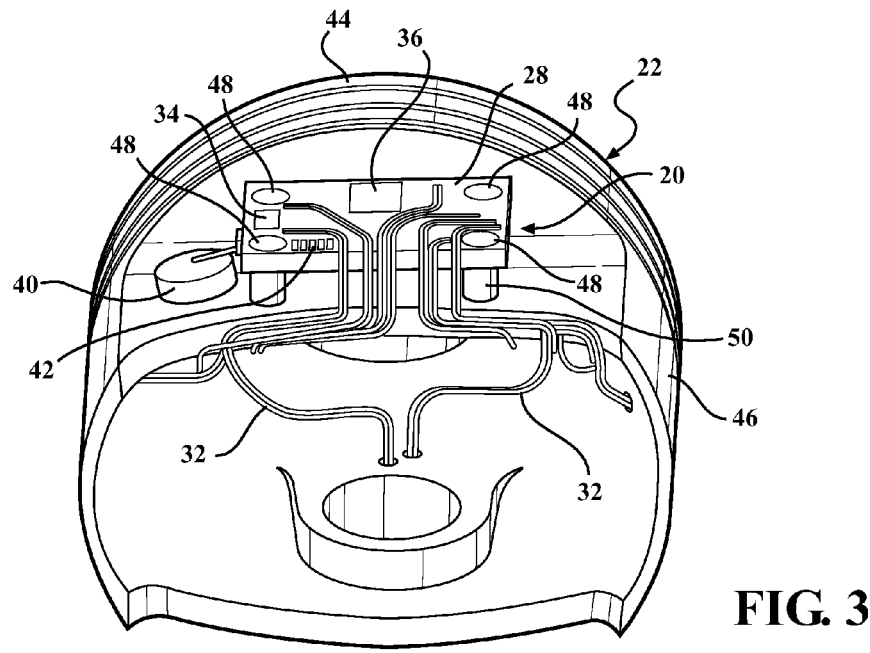
FIG. 3 is another perspective elevation view of the exemplary piston with the data collector of FIG. 1 mounted thereon.

Referring now to FIGS. 2 and 3, the exemplary piston 22 includes a crown portion 44 and a skirt portion 46, and the thermocouples 30 of the exemplary data collector assembly 20 are embedded within various locations of the crown and skirt portions 44, 46 for monitoring the temperatures at those locations during an engine test. The PCB 28 is mounted to a wall of the exemplary piston 22 with a plurality of threaded fasteners 48 and support legs 50, and the battery 40 is coupled directly to the exemplary piston 22 through, for example, adhesives. However, it should be appreciated that the PCB 28 and battery 40 could be coupled to the exemplary piston 22 through any desirable process.

Figure 4:
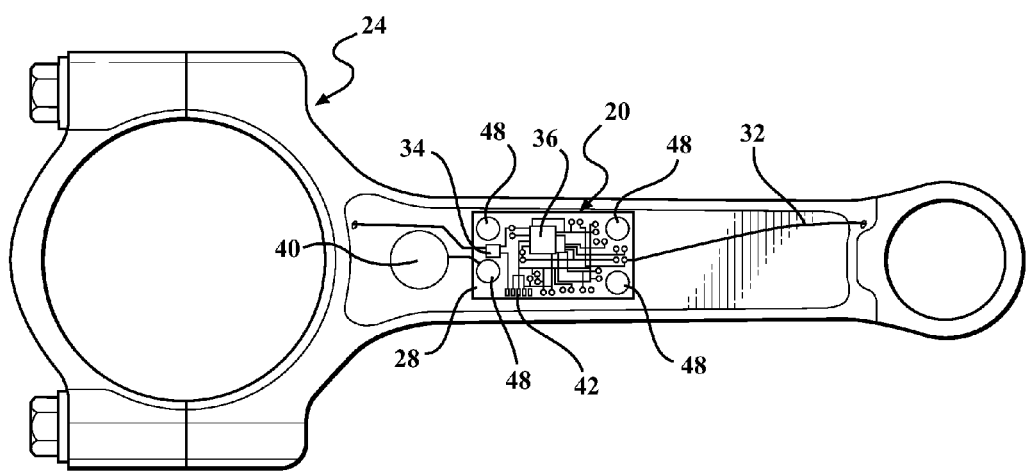
FIG. 4 is a top elevation view of an exemplary connecting rod with the data collector of FIG. 1 mounted thereon.

Referring now to FIG. 4, the exemplary connecting rod 24 is shown with the exemplary data collector assembly 20 mounted thereto. The PCB 28 is coupled to the connecting rod 24 through threaded fasteners 48, and the sensors are embedded within different locations of the connecting rod 24 for monitoring those locations.

Figure 5:
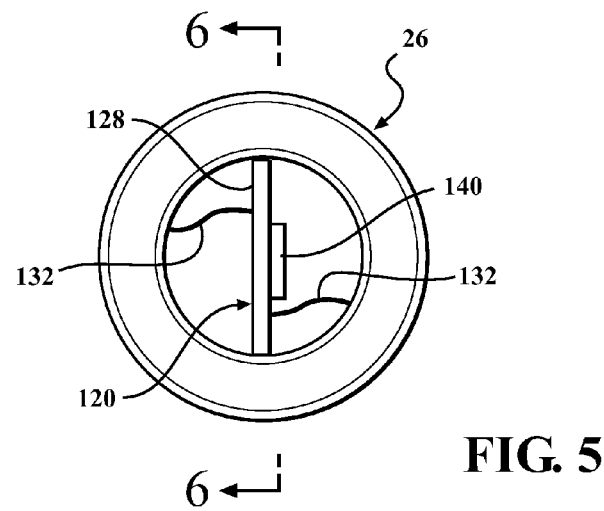
FIG. 5 is a side view of an exemplary gudgeon pin with a different exemplary data collector mounted therein.
Figure 6:
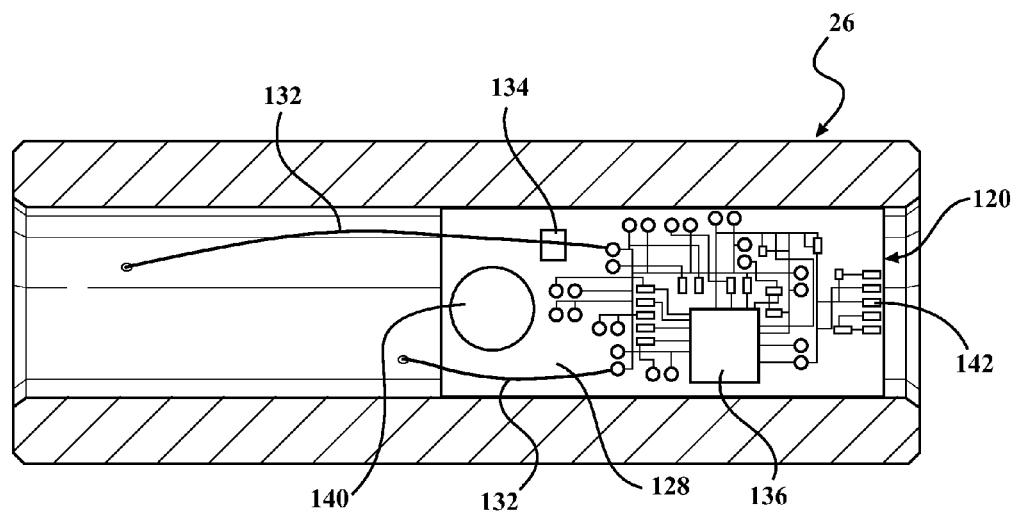
FIG. 6 is a cross-sectional view of the exemplary gudgeon pin taken along line 6-6 of FIG. 5.

Referring now to FIG. 5, the exemplary gudgeon pin 26 is shown with an alternate embodiment of the data collector assembly 120 disposed within the inner bore of the gudgeon pin 26. In his embodiment of the data collector assembly 120, like numerals offset by a factor of 100 are used to designate like components with the above-described embodiment of the data collector assembly 20. Because the inner bore of the gudgeon pin 26 lacks a flat surface for directly supporting the battery 140, the PCB 128 of this embodiment is elongated to support the power source 140 (shown as a battery 140).

Another aspect of the present invention provides for a method of making an internal engine component, e.g. a piston 22, a connecting rod 24 or a gudgeon pin 26. The exemplary method includes the steps of preparing a body of an internal engine component and coupling to the body at least one sensor 30 configured to sense a condition (such as temperature, pressure or strain) and generate an analog signal corresponding to the sensed condition. The method continues with the step of coupling to the body of the internal engine component a digital to analog converter 25 for converting the analog signal to a digital signal, a memory 34 (such as an SSD) for storing data, a clock 38 and a processor 36. The memory 34, clock 38 and processor 36 could all be mounted on a PCB 28. The processor 36 is in electrical communication with the analog to digital converter 25, the memory 34 and the clock 38. The method continues with the step of coupling a power source 40 to the body of the internal engine component and electrically connecting the power source 40 to the memory 34, the processor 36, the sensor 30, the analog to digital converter 25 and the clock 38. The internal engine component is configured such that the memory 34, the sensor 30, the analog to digital converter 25, the clock 38 and the processor 36 are substantially the only devices that draw electricity from the power source 40 during an engine test.

Yet another aspect of the present invention provides for a method of collecting and storing data corresponding to a condition of an internal engine component, such as a piston 22, a connecting rod 24 or a gudgeon pin 26. The data that is collected and stored could correspond to any desirable condition including, for example, temperature, pressure, strain, etc. The exemplary method includes the step of preparing an internal combustion engine including at least one internal engine component with a data collector assembly 20 coupled thereto. The data collector assembly 20 includes at least a sensor 30, an analog to digital converter 25, a processor 36, a memory 34, a clock 38 and a power source 40, and these elements are all electrically connected with one another.

The method continues with the step of testing the internal combustion engine. The test could be any desirable test of the internal combustion engine in operation. During the test, the method continues with the step of sensing at predetermined intervals with the sensor 30 at least one condition of the internal engine component. The method proceeds with the steps of generating at least one analog signal which corresponds to the at least one condition being sensed with the sensor 30 and converting the analog signal to a digital signal with the analog to digital converter 25. The method proceeds with the step of storing data corresponding to the digital signal into the memory 34, e.g. an SSD. During the above-discussed steps, the method includes the step of powering the sensor 30, analog to digital converter 25, processor 36, memory 34 and clock 38 with at least one power source 40. During the testing, the sensor 30, analog to digital converter 25, processor 36, memory 34 and clock 38 are substantially the only devices which draw electricity from the power source 40. As such, size and power capacity of the power source 40 may be minimized, which leads to packaging advantages as well as improved reliability.

Preferably, only the sensing, generating and converting steps are performed by the data collector assembly 20 before the testing of the internal combustion engine, and these steps are performed a predetermined frequency. Then, during the engine test, the sensing, generating, converting and storing steps are all performed at a frequency greater than the predetermined frequency. In the exemplary embodiment, this is accomplished because the method additionally includes the step of determining that the testing of the internal combustion engine has started in response to the signal from the sensor crossing a predetermined threshold. For example, the predetermined threshold could be temperatures above one hundred and fifty degrees Fahrenheit (150° F.). As such, the data collector assembly 20 does not have to be "turned on" or otherwise activated by a technician before or during the engine testing process but also does not waste energy by only sampling data at the higher frequency before the engine test starts. Likewise, the data collector assembly 20 may be configured to automatically return to only performing the sensing, generating and converting steps in response to the signal crossing back over the predetermined threshold. The exemplary method additionally includes the step of extracting the data from the memory 34 to another device (e.g. a computer) only after the engine test is completed.

Obviously, many modifications and variations of the present invention are possible in light of the above teachings and may be practiced otherwise than as specifically described while within the scope of the appended claims.

What is claimed is:

1. A data collector for collecting and storing data related to at least one condition of an internal engine component during an engine test, comprising:

at least one sensor for sensing at least one condition of the internal engine component and for generating at least one signal corresponding to said sensed condition;

at least one analog to digital converter in electrical communication with said at least one sensor for converting said signal into at least one digital signal;

at least one memory for storing data;

a clock;

at least one processor in electrical communication with said at least one analog to digital converter, said at least one memory and said clock, wherein said at least one processor processes said at least one signal and stores data corresponding to said at least one digital signal on said memory; and at least one power source electrically connected to said at least one sensor, said at least one analog to digital converter, said at least one memory, said at least one processor and said clock, and wherein said sensor, said at least one analog to digital converter, said at least one memory, said at least one processor and said clock are configured to be substantially the only devices that draw electricity from said at least one power source during the engine test.

2. The data collector as set forth in claim 1 wherein said at least one processor only stores data in said memory in response to said at least one signal from said at least one sensor crossing a predetermined threshold.

3. The data collector as set forth in claim 1 wherein said processor processes said at least one digital signal at a predetermined frequency and processes and stores data in said memory an increased frequency in response to said at least one signal crossing a predetermined threshold.

4. The data collector as set forth in claim 1 wherein said at least one sensor is further defined as a plurality of temperature sensors.

5. The data collector as set forth in claim 4 wherein said temperature sensors are thermocouples or thermistors.

6. The data collector as set forth in claim 1 further including a computer connection port in electrical communication with said memory for uploading said data stored on said memory to an external computer.

7. The data collector as set forth in claim 6 wherein said computer connection port is a serial connector.

8. The data collector as set forth in claim 1 wherein said at least one power source is at least one battery.

9. An internal engine component, comprising:

a body;

at least one sensor for sensing at least one condition and for generating at least one signal corresponding to said sensed condition and coupled to said body;

at least one analog to digital converter in electrical communication with said at least one sensor for converting said signal into at least one digital signal;

a memory for storing data;

a clock;

a processor in electrical communication with said at least one analog to digital converter, said at least one memory and said clock, wherein said processor processes said at least one signal and stores data corresponding to said at least one signal on said memory; and a power source electrically connected to said at least one sensor, said at least one analog to digital converter, said memory, said processor and said clock, and wherein said at least one sensor, said at least one analog to digital converter, said memory, said processor and said clock are configured to be substantially the only devices that draw electricity from said power source during an engine test.

10. The internal engine component as set forth in claim 9 wherein said processor only stores data in said memory in response to said at least one signal crossing a predetermined threshold.

11. The internal engine component as set forth in claim 9 wherein said processor processes said at least one signal at a predetermined frequency and processes said at least one signal and stores data in said memory at an increased frequency in response to said at least one signal crossing a predetermined threshold.

12. The internal engine component as set forth in claim 9 further including a computer connection port in electrical communication with said memory for uploading said data stored on said memory to an external computer.

13. The internal engine component as set forth in claim 9 wherein said at least one power source is a battery.

14. A method of making an internal engine component, comprising the steps of:

preparing a body of an internal engine component;

coupling to the body of the internal engine component at least one sensor configured to sense a condition and generate a signal corresponding to the sensed condition;

coupling to the body of the internal engine component at least one analog to digital converter for converting the signal into a digital signal, at least one memory for storing data, a clock and at least one processor and wherein the processor is in electrical communication with the at least one analog to digital converter, the at least one memory and the clock; and coupling at least one power source to the body and electrically connecting the power source to the at least one memory, the processor, the at least one sensor, the at least one analog to digital converter and the clock and wherein the at least one memory, the processor, the at least one sensor, the at least one analog to digital converter and the clock are configured to be substantially the only devices that draw electricity from the at least one power source during an engine test.

15. A method of collecting and storing data corresponding to a condition of an internal engine component, comprising the steps of:

preparing an internal combustion engine including at least one internal engine component with a data collector coupled thereto, wherein the data collector includes at least one sensor, at least one analog to digital converter, a processor, a memory and a clock;

testing the internal combustion engine;

sensing with the at least one sensor at least one condition of the internal engine component;

generating at least one signal corresponding to the at least one condition sensed by the at least one sensor;

converting the at least one signal to at least one digital signal with the analog to digital converter;

storing data corresponding to the at least one digital signal in the memory; and powering the sensor, analog to digital converter, processor, memory and clock with at least one power source, wherein the sensor, analog to digital converter, processor, memory and clock are substantially the only devices drawing electricity from the at least one power source during the engine test.

16. The method as set forth in claim 15 wherein the step of storing data in the memory is only in response to the at least one signal crossing a predetermined threshold.

17. The method as set forth in claim 15 wherein the sensing and generating steps are performed at a predetermined frequency and the sensing, generating and storing steps are performed at an increased frequency in response to the at least one signal crossing a predetermined threshold.

18. The method as set forth in claim 15 further including the step of extracting the data from the memory to another device only after the engine test has completed.

19. The method as set forth in claim 15 wherein the internal engine component is a piston, a pin or a connecting rod.

20. The method as set forth in claim 15 wherein the at least one power source is a battery.

* * * * *